(12) United States Patent
Blanchery

(10) Patent No.: US 7,813,147 B2
(45) Date of Patent: Oct. 12, 2010

(54) AC/DC CONVERTER FOR AERONAUTICS

(75) Inventor: Francis Blanchery, Chatou (FR)

(73) Assignee: Thales (FR)

( * ) Notice: Subject to any disclaimer, the term of this patent is extended or adjusted under 35 U.S.C. 154(b) by 377 days.

(21) Appl. No.: 11/574,978

(22) PCT Filed: Sep. 5, 2005

(86) PCT No.: PCT/EP2005/054362

§ 371 (c)(1),
(2), (4) Date: Mar. 8, 2007

(87) PCT Pub. No.: WO2006/032607

PCT Pub. Date: Mar. 30, 2006

(65) Prior Publication Data

US 2008/0186749 A1    Aug. 7, 2008

(30) Foreign Application Priority Data

Sep. 24, 2004  (FR) .................................. 04 10150

(51) Int. Cl.
*H02M 7/12* (2006.01)
*H02M 7/155* (2006.01)
*H02M 7/162* (2006.01)

(52) U.S. Cl. .............................. 363/5; 363/64; 363/125; 323/255

(58) Field of Classification Search .................. 363/3, 363/5, 2, 154, 126, 125, 129, 130, 64; 323/250, 323/252, 255, 256, 264

See application file for complete search history.

(56) References Cited

U.S. PATENT DOCUMENTS

| | | | |
|---|---|---|---|
| 3,641,418 A * | 2/1972 | Plette | 363/162 |
| 5,124,904 A * | 6/1992 | Paice | 363/3 |
| 5,619,407 A | 4/1997 | Hammond et al. | |
| 6,198,647 B1 | 3/2001 | Zhou et al. | |
| 6,249,443 B1 * | 6/2001 | Zhou et al. | 363/5 |
| 6,256,213 B1 * | 7/2001 | Illingworth | 363/89 |
| 7,005,840 B2 * | 2/2006 | Cester | 323/355 |
| 7,274,280 B1 * | 9/2007 | Paice | 336/148 |
| 2008/0130320 A1 * | 6/2008 | Bruzy et al. | 363/5 |
| 2008/0285314 A1 * | 11/2008 | Kojori | 363/37 |

* cited by examiner

*Primary Examiner*—Gary L Laxton
*Assistant Examiner*—Nusrat J Quddus
(74) *Attorney, Agent, or Firm*—Lowe Hauptman Ham & Berner, LLP

(57) ABSTRACT

The invention relates to the electrical power supply of aircraft and notably of large commercial aircraft.

According to the invention, the aircraft is equipped with an AC-DC converter that distributes power over a DC network starting from a three-phase alternating voltage of 230 volts applied to its main inputs (E1, E2, E3). The converter comprises an autotransformer which preferably has nine outputs (A1, A2, A3, B1, B2, etc.) for a nine-phase rectification. These outputs are applied to a rectifier bridge with 18 diodes. When the aircraft is on the ground, the AC power is delivered at 115 volts from a ground generator; it is applied via a three-phase connector (CAUX) to auxiliary inputs (M1, M2, M3) connected to intermediate taps of the three-phase windings forming the AC-DC converter.

6 Claims, 3 Drawing Sheets

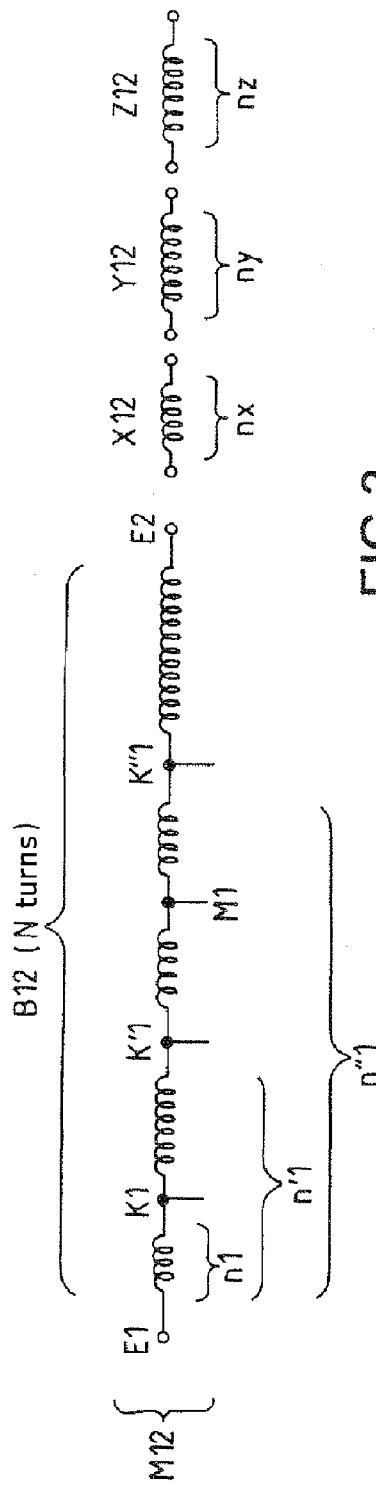
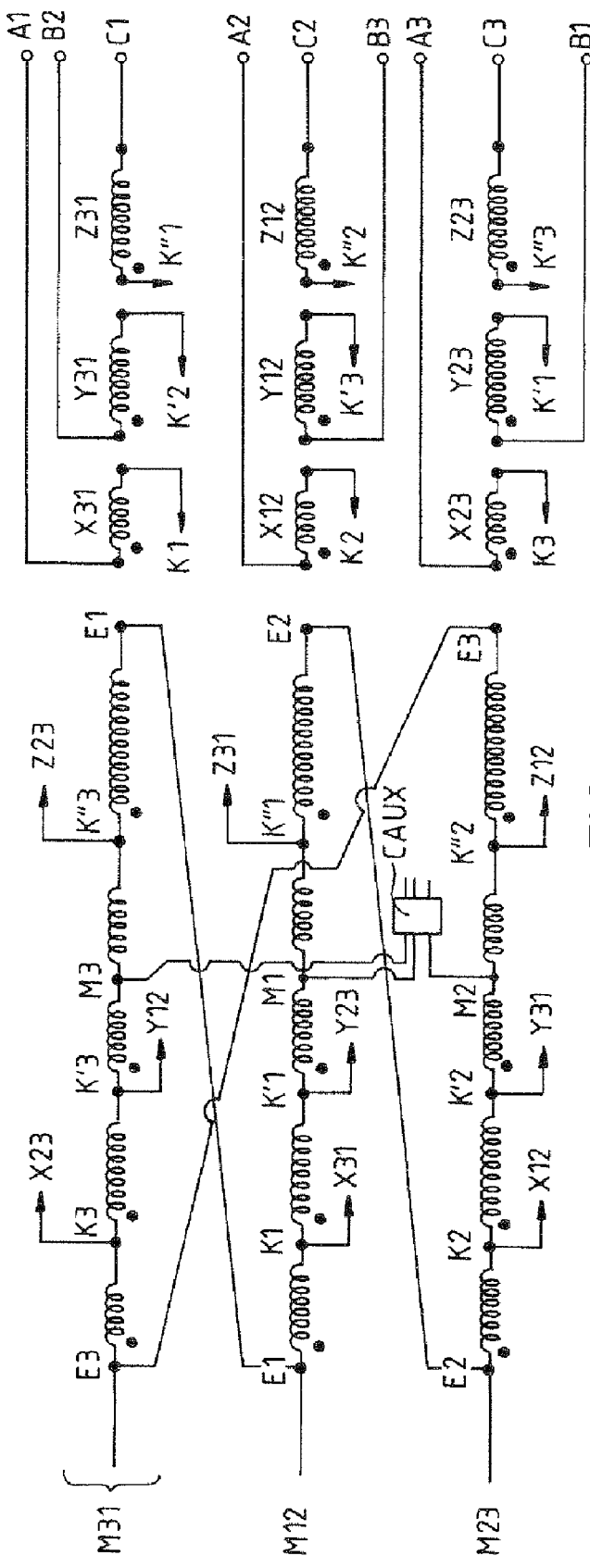
FIG.3
FIG.4

AC/DC CONVERTER FOR AERONAUTICS

RELATED APPLICATIONS

The present Application is based on International Application No. PCT/EP2005/054362, filed on Sep. 4, 2005, which in turn corresponds to French Application No. 04 10150 filed on Sep. 24, 2004, and priority is hereby claimed under 35 USC §119 based on these applications. Each of these applications are hereby incorporated by reference in their entirety into the present application.

FIELD OF THE INVENTION

The invention relates to the electrical power supply of aircraft and notably of large commercial aircraft.

BACKGROUND OF THE INVENTION

In large-sized aircraft such as airplanes for transporting tens or hundreds of passengers, the supply of electrical power becomes a very significant element in the general design of the aircraft. The reason for this is that the amount of electrical equipment installed on board and used either for the operation of the aircraft or for the onboard services is growing and is consuming more and more power.

This energy is produced by alternators coupled to the engines of the aircraft and the alternators usually supply a three-phase voltage of 115 volts r.m.s. between neutral and phase, at a frequency of 400 Hz. This voltage is carried inside the aircraft by electrical cables whose cross-section is proportional to the square of the value of the current that these cables must be able to carry. Typically, several hundred meters of cable capable of carrying several kilowatts are needed. This results in a very large weight of copper or aluminum to be installed into the aircraft.

In consequence, it was seen that it could be preferable to now design aircraft in which the power is carried at a minimum of 230 volts, in order to divide substantially by 4 the cross-section of the cables carrying the power. The alternators of such aircraft will therefore be designed to directly supply a three-phase voltage at 400 Hz and 230 volts r.m.s. between phase and neutral. In addition, these modern aircraft will now be equipped with a distribution network of DC electrical power, typically at 540 volts (plus or minus 270 volts with respect to the metallic structure of the aircraft). The advantage of the DC power distribution is to allow, by means of variable-frequency inverters, an individual speed control to be effected for certain synchronous or asynchronous motors present in the aircraft (compressors, air-conditioning units, fuel pumps, etc.).

Furthermore, aircraft have to consume electrical power when they are stationary on the ground at an airport with engines stopped. This power is required in order to provide lighting, air-conditioning, maintenance, starting, etc. functions.

They are therefore connected, via a three-phase connector accessible on the exterior of the aircraft, to electrical power generator units situated on the ground, administered by airports. The generator units all supply three-phase power at 115 volts r.m.s. since the majority of airplanes are equipped for operation with 115 volts r.m.s. It may be envisioned that, in the future, airports equip themselves with generators supplying both 115 volts and 230 volts, or that special units supplying 230 volts be provided for the case where an airplane equipped with 230 volt systems might land. However, that implies a cost that the airports do not wish to carry and this solution is only to be envisioned in the very long term when the number of aircraft equipped with 230 volt systems will be very significant.

In the immediate term, the solution is to provide a three-phase transformer on the aircraft placed between an external power supply connector (designed to be hooked to the ground generator) and the 230 volt power supply network on the airplane. This transformer adds more weight and takes up additional space solely for this reason of airport logistics.

The present invention proposes a solution for limiting the drawbacks resulting from this situation. This solution is applicable when the aircraft possesses a DC electrical power distribution network receiving the power from a three-phase alternator and an AC-DC converter (in practice an autotransformer followed by a rectifier bridge) in order to transform the AC power into DC power.

SUMMARY OF THE INVENTION

According to the invention, the AC-DC converter, designed to be connected by three main inputs to a supply of three-phase voltage of given amplitude Va, comprises an autotransformer with three main inputs and more than three outputs and a rectifier bridge with more than three phases connected to the outputs of the autotransformer, the autotransformer comprising a magnetic core with three branches and on each branch a main winding and auxiliary windings, the auxiliary windings of one branch being electrically connected at one end to terminals of the main windings of this branch or of another branch and at the other to a respective output of the autotransformer, all of the connections exhibiting a circular permutational symmetry allowing a balanced three-phase operation. The converter is characterized in that it comprises three auxiliary power supply terminals, each one on a respective winding according to a three-phase permutational symmetry, at a location where the amplitude of the voltage is Va/g when the power supply voltage present on the inputs is Va, these three auxiliary power supply terminals being connected to a three-phase connector in order to form an auxiliary three-phase input allowing AC electrical power to be occasionally received at a voltage Va/g of different amplitude from the amplitude Va to be applied to the main inputs.

In practice, the auxiliary terminals are situated at a location where the amplitude is Va/2. Thus, in normal operation of the aircraft, with the engines running, the three main inputs receive the AC power at 230 volts 400 Hz supplied by the engine alternators. In operation on the tarmac, with engines stopped power can be transmitted by the ground generators toward the auxiliary inputs and, if this power is at 115 volts, the autotransformer will continue to operate exactly as if it were receiving power at 230 volts on its main inputs. This results from the choice of the position of the intermediate taps and from the principle of reversibility of autotransformers.

The amplitude Va is, for example, the amplitude of the single-ended voltage present between one input of the three-phase system and a physical or virtual neutral of the circuit, and in this case of course the amplitude Va/g is also a single-ended voltage. However, the reasoning is the same if the amplitudes between phases of the main inputs are considered: the auxiliary terminals are chosen at the locations where the amplitude between phases of the three-phase system is divided by g. The number g will, in general, be greater than 1, the main advantage of the system being when g is equal to 2 or thereabouts.

The principle of the invention may be adapted to any type of autotransformer construction, to 12 phases or 18 phases or more. For some constructions of autotransformer, g cannot have too high a value. The very simple principle for determining the positions of the auxiliary terminals, and how that depends on the construction of the autotransformer, will be explained hereinbelow.

In one preferred exemplary embodiment, the main windings are electrically connected in a 'delta' configuration between the three main inputs, the auxiliary windings of one magnetic branch are each connected to a tap of a main winding of another branch, and the auxiliary power supply terminals are each placed on a main winding. In order to allow an auxiliary supply of power at a voltage Va/2 to occasionally be used, the auxiliary terminals are then center-tap terminals placed in the middle of the main windings.

In other embodiments, the main windings are not necessarily directly connected to the main inputs; an auxiliary winding may for example be connected between a main input and one end or an intermediate tap of a main winding. In this case, the terminal that allows, for example, a supply of voltage at Va/2 to be used is not situated in the middle of the main winding. It will be explained hereinbelow how the position of the auxiliary terminals is very simply defined by using a vector construction.

BRIEF DESCRIPTION OF THE DRAWING

Other features and advantages of the invention will become apparent upon reading the detailed description that follows which is presented with reference to the appended drawings in which:

FIG. 3 shows the windings provided on one magnetic branch of the autotransformer;

FIG. 4 shows the configuration of the autotransformer corresponding to the vector composition in FIG. 2;

DETAILED DESCRIPTION OF THE PREFERRED EMBODIMENTS

A few general principles on AC-DC converters, formed by means of a three-phase autotransformer and a rectifier bridge, will firstly be recalled.

The autotransformer has three inputs for receiving a three-phase voltage and a higher number of outputs that are phase-shifted in order to supply an AC voltage with a larger number of phases allowing rectification with a lower residual ripple and with a lower re-injection of harmonic currents. Thus, typically, the three-phase system, whose three phases are separated by 120°, can be transformed into a system with nine phases separated by 40° which may be considered as a system of three three-phase networks offset by 40° with respect to one another. At the output of the autotransformer, three bridges of six diodes are used, each bridge being supplied by one of these networks. These AC/DC converters with eighteen diodes are also referred to as 18-pulse converters.

In the autotransformer, there are essentially three main windings wound onto three different magnetic branches of a three-branch magnetic core, and there are several auxiliary windings wound onto these three branches and connected to intermediate taps provided on the windings of one or the other of the other branches (or sometimes even on the same branch).

Figure 1:
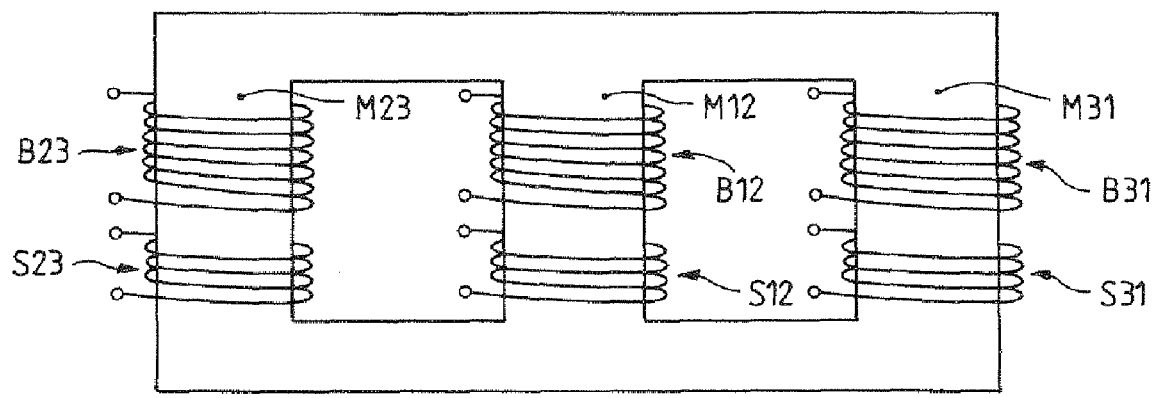
FIG. 1 shows the schematic construction of a three-phase transformer.

FIG. 1 serves as a reminder of this principle of a three-phase transformer with three magnetic branches M12, M23 and M31, three corresponding main windings B12, B23 and B31 and an example of auxiliary winding S12, S23, S31 on each branch. The windings are shown without mutual connections, the object of FIG. 1 being only to recall the principle of a three-phase magnetic circuit. The following figures will show the connections between the various main and auxiliary windings of the autotransformer.

For display convenience, the auxiliary windings are shown next to the main windings, although, in reality, the various windings on the same magnetic branch are disposed at the same location (one around the other, or even the layers of one interspersed between the layers of the other) in order to have exactly the same magnetic flux passing through them.

A voltage is created across the terminals of an auxiliary winding of a magnetic branch that is in phase with the voltage across the terminals of the main winding of the same branch. The voltage generated within the auxiliary winding depends
   on the voltage value across the terminals of the associated main winding,
   on the ratio between the number of turns in the main winding and in the auxiliary winding, and
   on the direction of rotation of the current in the auxiliary winding with respect to the direction of the current in the main winding.

The operation of an autotransformer is conventionally represented by a vector composition of the voltages across the terminals of the various windings. The phase and the amplitude of the voltage (single-ended voltage present at one point of the circuit or differential voltage present between two points of the circuit) may be represented by a vector whose length represents the amplitude of the AC voltage (single-ended or differential) and whose orientation represents the phase from 0° to 360° of this AC voltage.

In the following, the invention will be described using one exemplary embodiment where the autotransformer converts a three-phase voltage of given amplitude into a voltage with nine phases separated by 40°, of slightly lower amplitude than that of the three-phase voltage.

For the formation of such an autotransformer, the vector compositions are determined which, starting from the initial three phases, allow the nine phases sought to be constructed.

Figure 2:
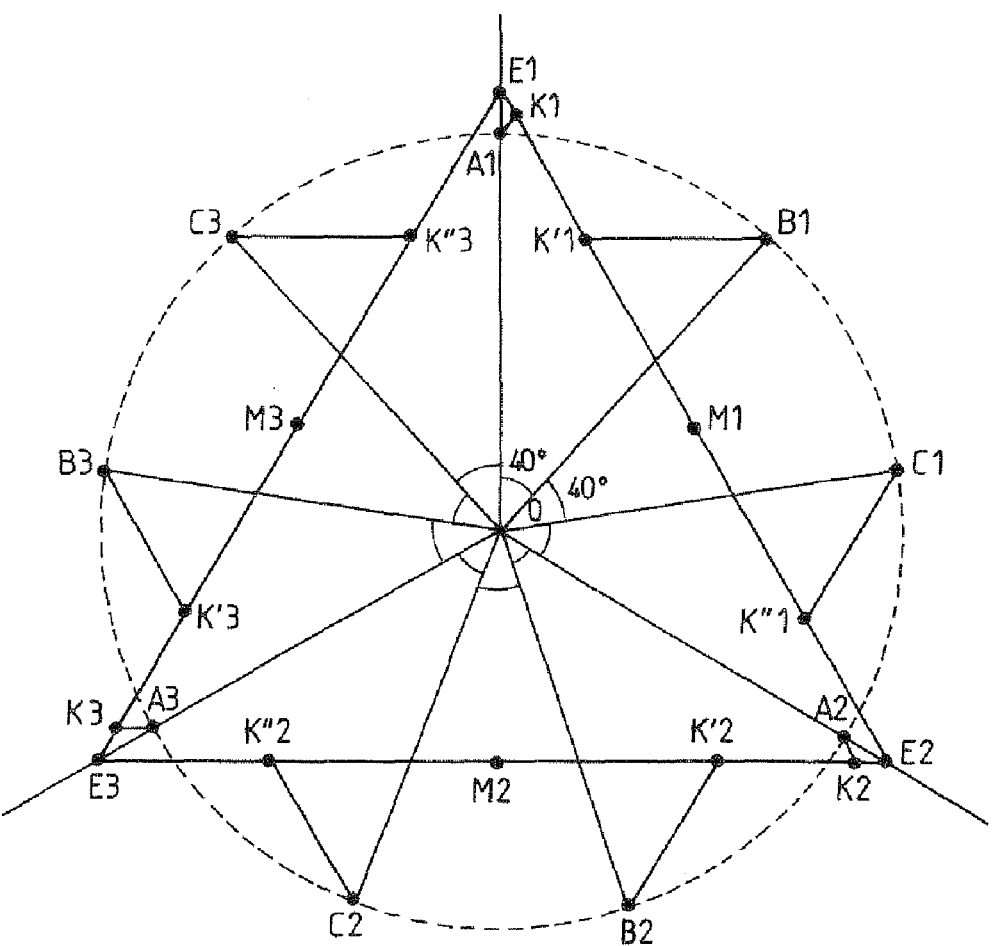
FIG. 2 shows a vector composition allowing the characteristics of a step-down autotransformer to be defined, in one preferred embodiment of the invention.
Figure 5:
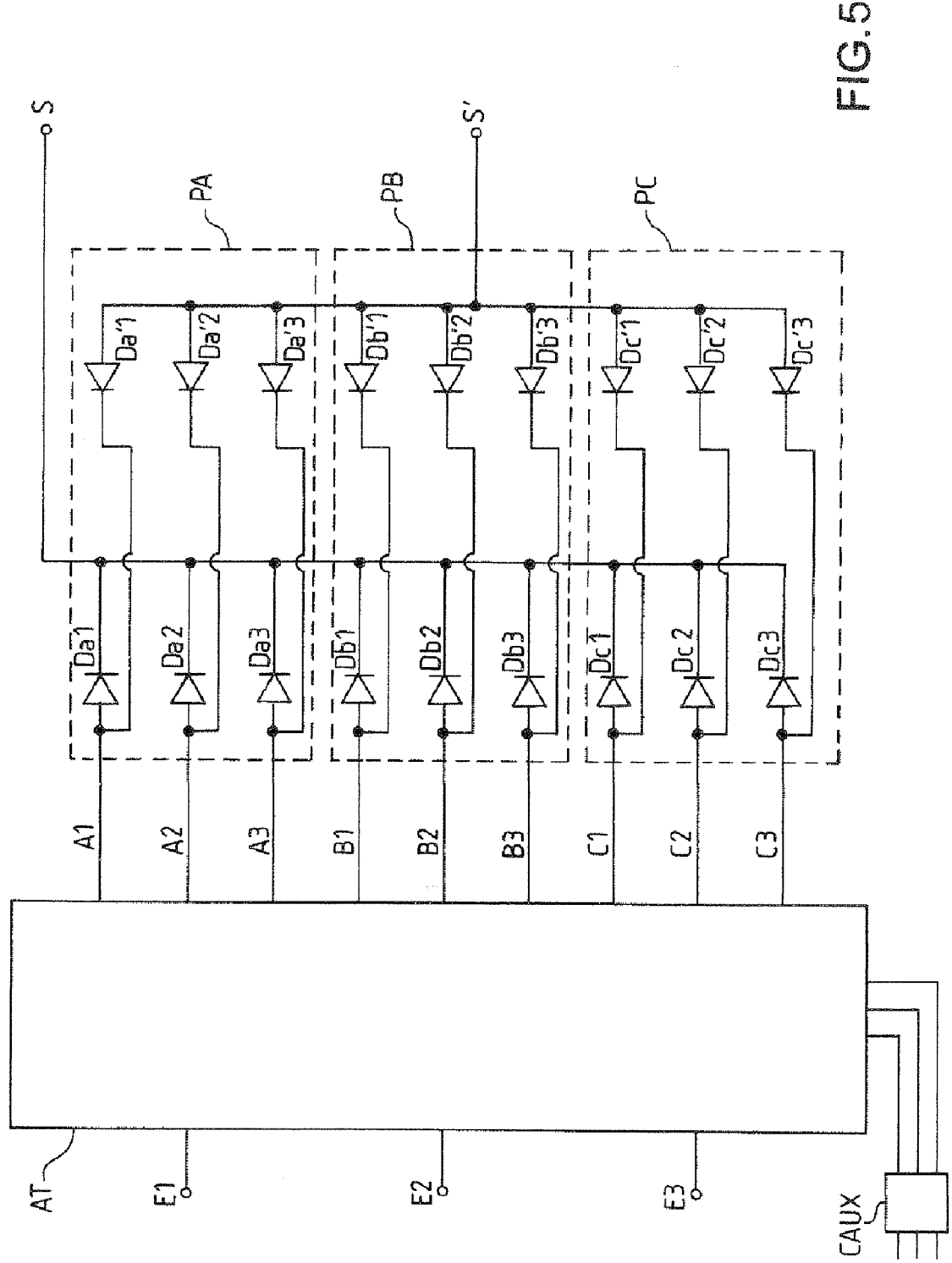
FIG. 5 shows the AC-DC converter using the autotransformer in FIG. 4.

In this example, the main windings B12, B23, B31 are connected in a delta configuration directly between the main inputs E1, E2, E3 receiving the three-phase AC voltage of 230 volts r.m.s. to be converted. FIG. 2 shows a vector composition corresponding to such an autotransformer.

The vectors used in the composition are obtained, on the one hand, starting from points representing the terminals of main or auxiliary windings and, on the other, using points representing intermediate taps of these windings. The voltage obtained between two intermediate taps of a main winding is in phase with the voltage on the main winding (the vectors are therefore collinear); its amplitude is a certain fraction of the voltage across the terminals of the main winding, this fraction being a function of the ratio between the number of winding turns situated between the intermediate taps and the total number of turns of the main winding; the relative length of the vector representing the voltage between two intermediate taps of a winding is determined by this ratio of number of turns.

According to the same principal, the voltage obtained across the terminals of an auxiliary winding associated with the main winding (in other words with the same magnetic flux passing through it hence wound at the same location on the same magnetic branch) is in phase with the voltage across the terminals of the main winding (the vectors are therefore parallel) and its amplitude is also determined by the ratio between the number of turns in the auxiliary winding and the number of turns in the main winding; the length of the vector representing the voltage on the auxiliary winding is therefore, relative to the length of the vector representing the voltage on the main winding, in the ratio of the number of turns.

For convenience, in the following, the same letters (for example E1 and E2) will denote both the terminals of a winding (in the figures showing windings) and the ends of the vector representing the voltage across the terminals of this winding (in the figures showing the vector compositions).

For the vector composition, a neutral point of origin O is arbitrarily defined and the single-ended input and output voltages of the autotransformer will be referenced with respect to this point. Thus, the vector OE1 represents the amplitude and the phase of the single-ended voltage present on the terminal E1 of the three-phase power supply. The neutral point O is a virtual point (input and output via delta configuration) of the circuit; if it is assumed that the three-phase power supply applied to E1, E2, E3 is well balanced, the neutral point represents the reference point where the vector sum of the voltages OE1, OE2, OE3 is zero. In the vector representation, the point O is the center of an equilateral triangle whose corners are the points E1, E2, E3. The vectors OE2 and OE3, of same amplitude as the vector OE1, are respectively oriented at +120° and −120° to the reference vector OE1. If the power supply applied to the terminals E1, E2, E3 is a three-phase power supply in delta configuration (preferred case), the vectors E1E2, E2E3, E3E1 represent the amplitudes and phases of the voltages between power supply lines, applied to the terminals of the main windings. They are at 120° with respect to one another. In order to simplify the vector notation, in all that follows, the first letter of a vector is considered as the origin of the vector and the second letter is the arrival point of the vector; thus, OE1 represents the vector starting from O and going as far as E1, and not the reverse.

In FIG. 2, the phase of the single-ended voltage OE1 (vertical direction) is chosen as phase reference. The direction of the vector E1E2 is at +150°; that of the vector E2E3 is at +270°, and that of the vector E3E1 is at +30°.

The vector composition in FIG. 2 allows nine voltages of phases at 40° to one another and of same amplitude, lower than that of the three-phase power supply voltage, to be constructed.

Three of the nine phases are aligned with the phases OE1, OE2, OE3 of the three-phase power supply of the autotransformer.

Starting from an initial assumption of coefficient k representing the ratio between the value Va' of the voltage of the nine phases and the value Va of the input voltage (single-ended OE1, OE2, OE3), the procedure is as follows: starting from the neutral point O, three systems are traced of three vectors of same amplitude Va' equal to the amplitude of OE1 multiplied by the reduction ratio k:

$$Va'=Va*k$$

It should be noted that k is less than 1 and may go as low as about 0.56.

The vectors of the first system define three points A1, A2 and A3 on the circle with center O and of radius Va'=k*Va. The vectors OA1, OA2, OA3 are aligned with the vectors OE1, OE2, OE3, respectively, and hence are separated by 120° with respect to one another. The vectors of the second system define three points B1, B2, B3 on the same circle with center O and of radius Va'. The vectors OB1, OB2, OB3 can be deduced from the vectors OA1, OA2, OA3 by rotation through +40°. Lastly, the vectors of the third system OC1, OC2, OC3 can be deduced from the vectors OB1, OB2, OB3 by a further rotation through +40° (it could also have been said that the vectors of the third system can be deduced from the vectors OA1, OA2, OA3 by a rotation through −40°, which amounts strictly to the same thing by reversing the denotations C1 and C3).

The final result is therefore nine vectors separated by 40° and having as amplitude Va'=k*Va.

Three intermediate points K1, K'1, K"1 are defined on the vector E1E2 which will physically constitute intermediate taps of the main winding B12.

The point K1 is the point of intersection between the vector E1E2 and a straight line having its origin at the point A1 and being parallel to the vector E3E1.

The point K'1 is the point of intersection of the vector E1E2 with a straight line starting from the point B1 and traced parallel to the vector E2E3.

Finally, the point K"1 is the point of intersection of the vector E1E2 with a straight line starting from the point C1 and traced parallel to the vector E3E1.

In the same manner, by circular permutation, the intermediate taps K2, K'2, K"2, K3, K'3, K"3 are determined.

On this construction, or by making a trigonometric calculation whose reproduction would be tedious and which is trivial since all the angles and also the respective lengths of OA1 and OE1 are known, the lengths of the vectors E1K1, A1K1, E1K'1, B1K'1, K"1C1 and E1K"1 are measured. The lengths of the other vectors, obtained by circular permutation, are clearly identical.

These lengths, referenced to the length of the vector E1E2, will define numbers of winding turns referenced to the total number N of turns on the primary winding.

Thus, the intermediate tap K1 in the main winding B12 is at a position such that the ratio n1/N between the number n1 of the turns falling between E1 and K1 and the total number N of turns on the primary winding B12 is:

$$n1/N=E1K1/E1E2$$

Similarly, the intermediate taps K'1 and K"1 are placed at positions such that the ratio between the number n'1 of turns situated between E1 and K'1 and the total number N of turns is $$n'1/N=E1K'1/E1E2$$

and the ratio between the number of turns n"1 situated between E1 and K"1 and the total number of turns N is:

$$n"1/N=E1K"1/E1E2$$

The points A1, B1 and C1 are determined starting from the vectors K1A1, K'1B1 and K"1C1 whose orientations are not those of the vector E1E2. The voltages corresponding to these vectors will therefore be defined using the auxiliary windings; the auxiliary windings are placed on the two other magnetic branches M23 and M31 of the magnetic circuit. These windings will have a first end connected to an intermediate tap, K1, K'1 or K"1 respectively, of the main winding B12 and a second end which will form an output A1, B1 or C1, respectively, of the autotransformer.

Thus, an auxiliary winding placed on the third magnetic branch M31 of the magnetic circuit (that which carries the third primary winding B31 connected between E3 and E1) will be used to establish a voltage represented by the vector K1A1 since this vector is parallel to the vector E3E1. This winding will have one end connected to the tap K1 and its other end will form an output terminal A1 of the autotransformer. Similarly, an auxiliary winding placed on the second branch of the magnetic circuit (that which carries the second main winding B23 connected between E2 and E3) will be used to establish a voltage represented by the vector K'1B1 since the vector K'1B1 is parallel to E2E3. This winding will have one end connected to the tap K'1 and its other end will form a second output B1 of the autotransformer, phase-shifted by 40° with respect to the output A1. Similarly again, an auxiliary winding placed on the third magnetic branch M31 (that which carries the main winding B31 connected between E3 and E1) will be used to establish the voltage K"1C1. This winding will have one end connected to the intermediate tap K"1 and another end defining a third output C1 phase-shifted by 40° with respect to the second.

The other outputs A2, B2, C2 then the outputs A3, B3, C3 are formed according to the same principle, by circular permutation.

Finally, an auxiliary power supply terminal M1 is provided on the winding B12, in the middle of the latter, and in the same way, auxiliary terminals M2 and M3 with the same positioning as the terminal M1 but on the winding B23 and the winding B31, respectively. The three terminals M1, M2, M3 form, on the vector composition in FIG. 2, an equilateral triangle whose sides have half the length of the length of the vectors E1E2, E2E3 and E3E1.

When the terminals E1, E2 and E3 are supplied by a three-phase voltage of amplitude Va, the voltages present on these terminals form a three-phase system of amplitude Va/2, phase-shifted by 60° with respect to the system of power supply voltages.

Reciprocally, if a three-phase voltage of amplitude Va/2 is applied to the terminals M1, M2, M3, a three-phase voltage of amplitude Va, phase-shifted by −60°, is again found on E1, E2, E3, and everything happens in the autotransformer as if the terminals E1, E2 and E3 were receiving a three-phase power supply voltage of amplitude Va, phase-shifted by +60° with respect to the voltages on the terminals M1, M2, M3.

Consequently, according to the invention, the auxiliary terminals M1, M2, M3 are connected to a three-phase connector. This connector may be used in order to supply the AC-DC converter when the latter does not receive any supply of power on the terminals E1, E2 and E3, and notably when the aircraft is at an airport with its engines stopped.

By using this type of autotransformer configuration and by supplying the terminals M1, M2, M3 with the voltage of 115 volts available on the tarmac at airports, everything happens as if the converter were supplied with 230 volts at the inputs E1, E2, E3 even though these inputs are not powered; neither dedicated power generators supplying 230 volts on the ground, nor a dedicated three-phase 115v/230v transformer in the aircraft are any longer required.

If the auxiliary terminals M1, M2, M3 are not in the middle of the main windings but displaced to the right or to the left with respect to this center point, the voltages present on these terminals are in a ratio of g less than 2 with respect to the power supply voltage applied to E1, E2, E3. The system could therefore be used to supply the aircraft with an external voltage of amplitude Va/g with g less than 2. It should be noted that in this scenario no tap position can be found on the main winding that would allow a three-phase voltage below Va/2 to be obtained, in other words that g can, at most, be equal to 2.

FIG. 3 shows the windings situated on the first branch M12 of the magnetic circuit: the main winding B12 situated between the input terminals E1 and E2, with its intermediate taps K1, K'1 and K"1 and the auxiliary power supply terminal M1; and three auxiliary windings X12, Y12 and Z12, which are situated on the same magnetic branch M12 as the main winding B12 and have the same magnetic flux passing through them, but which are not directly connected to the main winding B12. These auxiliary windings X12, Y12, Z12 produce the voltages represented by the vectors K2A2, K'3B3 and K"2C2 which must all be in phase with the voltage on the main winding B12. These windings are therefore each connected between an intermediate tap K2, K'3 or K"2 on the main windings B23 and B31 and a respective output A2, B3 or C2 of the autotransformer.

The number of turns nx, ny and nz on these three windings X12, Y12 and Z12 are calculated relative to the number N of turns on the main winding as a function of the length of these three vectors:

$nx/N = K2A2/E1E2$ $ny/N = K'3B3/E1E2$ $nz/N = K"2C2/E1E2$

The second and the third magnetic branches M23 and M31 of the autotransformer are formed in the same manner.

FIG. 4 shows the three magnetic branches with their respective assemblies of main and secondary windings, and this time with the connections that completely establish the desired voltage amplitudes and phases allowing the outputs A1, B1, C1, A2, B2, C2, A3, B3, C3 to represent a nine-phase system having the desired amplitude Va' and able to directly supply a system of three rectifier bridges each with six diodes. In FIG. 4, in order to take account of the question of the relative direction of winding of the turns, it has been considered that all the windings rotate in the same direction when going from the left toward the right and this is the reason that, for example, the intermediate tap K1 is connected to the right-hand terminal of the winding X31, the output A1 being the left-hand terminal, because the vector K1A1 has to be oriented in the opposite direction to the vector E3E1.

The center-tap auxiliary power supply terminals M1, M2, M3 on the main windings are connected to an auxiliary three-phase connector CAUX for the 115 volt power supply from a three-phase ground generator.

The circuit diagram in FIG. 4 and the vector diagram in FIG. 2 are given purely by way of example of an autotransformer producing nine phases starting from three phases. Other solutions are possible and allow step-down autotransformers (this is the case in FIG. 2) or step-up autotransformers to be made.

The autotransformer thus constructed is associated with a rectifier bridge with 18 diodes in order to form an AC-DC converter.

The direct outputs (A1, A2, A3) of the autotransformer are connected to a first bridge PA of six diodes Da1, Da2, Da3, Da'1, Da'2, Da'3. The outputs phase-shifted by +40° are connected to a second bridge PB of six diodes Db1, Db2, Db3, Db'1, Db'2, Db'3, and the outputs phase-shifted by −40° are connected to a third bridge PC of six diodes Dc1, Dc2, Dc3, Dc'1, Dc'2, Dc'3.

The three rectifier bridges have common outputs S and S' which form the outputs of the converter.

The diode Da1 is forward connected between the output A1 and a positive terminal S forming one of the two DC output terminals of the converter. The diode Da'1 is reverse connected between the output A1 and a negative terminal S' forming the other DC output terminal of the converter.

The connection is the same for all the other diodes: the diode Da2 and the diode Da'2 are forward and reverse connected, respectively, between A1, on the one hand, and S and S', respectively, on the other. The diode Db1 and the diode Bb'1 are forward and reverse connected, respectively, between B1, on the one hand, and S and S', on the other, and so on; one forward-biased diode is connected between one output terminal of the autotransformer and the terminal S and one reverse-biased diode is reverse connected between this output terminal and the terminal S'.

Thus, one realistic exemplary embodiment of the invention has been described. Numerous variants may be envisioned, mainly depending on the type of vector composition that will have been used in the construction of the autotransformer. Starting from this vector composition, the auxiliary power supply terminals that need to be provided on the autotransformer are determined very easily: if g is the coefficient between the normal voltage Va that the converter should receive at its main inputs (for example 230 volts) and the occasional voltage Va/g that should be received by the auxiliary inputs, then on the vector composition of center O (virtual or real node of the three-phase power supply at E1, E2, E3), which composition depends on the structure of the autotransformer, a circle of center O and of radius Va/g is traced and the intersections with vectors representing windings are noted. Three intersections forming an equilateral triangle of center O are chosen from amongst these intersections and these three points define auxiliary terminals that will be placed on these windings when the autotransformer is constructed. The three auxiliary terminals will be connected to an autotransformer. If the circle does not cross any vector representing a winding, it is because the value of g is outside of the feasible range for this type of structure.

This determination of auxiliary terminals may be applied to simple modifications of the diagrams in FIGS. 2 and 4 or to diagrams that are widely different. Amongst the simple modifications, it may be envisioned for example that the output A1 be obtained starting from an auxiliary winding of the branch M23 rather than M31 (and the same thing of course for the other outputs A2 and A3 by circular permutation). Amongst more complex modifications, it may be envisioned that the ends of the three main windings in delta configuration be not directly connected to the main inputs E1, E2 and E3: an auxiliary winding may be connected between one main input and one end or an intermediate tap of a main winding. This auxiliary winding can be situated on the same magnetic branch as the main winding to whose end it is connected; it may also be envisioned (case of a step-up autotransformer) that the three main windings be connected in delta configuration but that the main inputs be connected to auxiliary windings connected to an intermediate tap of a main winding that is not situated on the same magnetic branch as the auxiliary winding. The variety of configurations is very wide and, depending on the configuration chosen, a range of values of g is possible. It is even possible that the auxiliary terminals be placed on auxiliary windings rather than on the main windings if the circle of radius Va/g crosses the vectors representing the auxiliary windings of the autotransformer.

The invention claimed is:

1. An AC-DC converter, comprising:
an autotransformer having three main inputs configured to be optionally connected to a first three-phase AC supply voltage and more than three outputs and a rectifier bridge with more than three phases connected to the outputs of the autotransformer, the autotransformer comprising a magnetic core with three branches and on each branch a main winding and auxiliary windings, the auxiliary windings of one branch being electrically connected, at one end, to taps of the main windings of this branch or of another branch and, at the other end, to a respective output of the autotransformer, all of the connections exhibiting a circular permutational symmetry allowing a balanced three-phase operation; and
three auxiliary input terminals configured to be optionally connected to a second three-phase AC supply voltage, each one tapped on a respective winding according to a three-phase permutational symmetry, at a location where the amplitude of the voltage is Va/g when the first three-phase AC supply voltage present on the main inputs having an amplitude Va, where g is a number different from 1, and wherein these three auxiliary input terminals are connected to a three-phase connector in order to form an auxiliary three-phase input for the second three-phase AC supply voltage having an amplitude Va/g to be optionally received in replacement for said first three-phase AC supply voltage having the amplitude Va at the main inputs of the AC-DC converter with the same effect as if said first three-phase AC supply voltage were applied to said main inputs.

2. The converter as claimed in claim 1, wherein the auxiliary input terminals are tapped at a location where the amplitude is Va/2 when the first three-phase AC supply voltage present on the AC-DC main inputs has said amplitude Va.

3. The AC-DC converter as claimed in claim 1, wherein the main windings are electrically connected in a delta configuration between the three main inputs of the AC-DC converter, the auxiliary windings of one magnetic branch are each connected to a tap of a main winding of another branch, and the auxiliary input terminals are each tapped on a main winding.

4. The converter as claimed in claim 3, wherein the auxiliary input terminals are center-tap terminals placed in the middle of the main windings.

5. The converter as claimed in claim 1, wherein the main windings are connected in a delta configuration and have each an end terminal or an intermediate tap connected to one main input through an auxiliary winding.

6. The converter as claimed in claim 2, wherein the main windings are connected in a delta configuration and have each an end terminal or an intermediate tap connected to one main input through an auxiliary winding.

* * * * *